United States Patent
Hai-Maharsi

(10) Patent No.: US 8,964,433 B2
(45) Date of Patent: Feb. 24, 2015

(54) INSULATOR INTEGRATED POWER SUPPLY

(75) Inventor: Mohamed Y. Hai-Maharsi, Cypress, TX (US)

(73) Assignee: ABB Technology AG, Zurich (CH)

(*) Notice: Subject to any disclaimer, the term of this patent is extended or adjusted under 35 U.S.C. 154(b) by 1171 days.

(21) Appl. No.: 12/919,031

(22) PCT Filed: Feb. 17, 2009

(86) PCT No.: PCT/US2009/034298
§ 371 (c)(1),
(2), (4) Date: May 4, 2011

(87) PCT Pub. No.: WO2009/108544
PCT Pub. Date: Sep. 3, 2009

(65) Prior Publication Data
US 2011/0255318 A1    Oct. 20, 2011

Related U.S. Application Data

(60) Provisional application No. 61/031,118, filed on Feb. 25, 2008.

(51) Int. Cl.
*H02M 7/06* (2006.01)
*H01H 33/00* (2006.01)
*H01B 17/00* (2006.01)
*H01H 33/02* (2006.01)
*H02H 1/06* (2006.01)

(52) U.S. Cl.
CPC ............ *H01H 33/008* (2013.01); *H01B 17/005* (2013.01); *H01H 33/022* (2013.01); *H01H 33/027* (2013.01); *H02H 1/06* (2013.01)
USPC ........................................................ 363/126

(58) Field of Classification Search
USPC ........................................................ 363/126
See application file for complete search history.

(56) References Cited

U.S. PATENT DOCUMENTS

| | | | |
|---|---|---|---|
| 5,091,616 A | 2/1992 | Ramos et al. | |
| 5,583,729 A * | 12/1996 | Hassler et al. | 361/39 |
| 6,687,110 B2 | 2/2004 | Murray et al. | |
| 7,133,271 B2 * | 11/2006 | Jonas et al. | 361/115 |
| 7,417,554 B2 * | 8/2008 | Benke et al. | 340/638 |
| 7,495,574 B2 * | 2/2009 | Rocamora et al. | 340/638 |
| 7,576,635 B2 * | 8/2009 | Bender et al. | 340/292 |
| 2005/0111533 A1 * | 5/2005 | Berkman et al. | 375/220 |

FOREIGN PATENT DOCUMENTS

JP        11317133 A    * 11/1999

OTHER PUBLICATIONS

US0805, WO, Jun. 24, 2010, ISR.

* cited by examiner

*Primary Examiner* — Jue Zhang
(74) *Attorney, Agent, or Firm* — Paul R. Katterle; Melissa J. Szczepanik

(57) ABSTRACT

A power scavenging device attaches to an overhead power cable and a support pole. The power scavenging device includes a non-conducting outer body and a first capacitor and a second capacitor that are connected in series forming a voltage divider. A voltage source converter is electrically connected to the output of the power scavenging device. The voltage source converter outputs a regulated power.

13 Claims, 5 Drawing Sheets

INSULATOR INTEGRATED POWER SUPPLY

TECHNICAL FIELD

The present invention relates to power supplies for electrical distribution equipment. Specifically, the present invention relates to a power supply integrated into a bushing.

BACKGROUND

Line currents in electric power distribution cables are commonly used to produce auxiliary power. This auxiliary power often referred to as "scavenged power," is used to power a variety of devices used in monitoring and controlling electrical distribution.

One major limitation of scavenging power from line currents is the elimination of that power source when a downstream fault occurs. In the case of a recloser, for example, a fault may result in the opening of the line at that point, which in turn eliminates the flow of the current upstream of the trip. In such a situation, any device relying on current flow for power will not function. If, for example, a recloser relied on such a power source, it may not have the power to maneuver the reclosing mechanism and close or open the breaker. For this very reason, reclosers include internal batteries to power the device when the line is open.

Many other power system applications, and specifically power distribution systems, require a battery to supply power when line current is eliminated. Examples of these applications include fault indicators, wireless transmitters, IEDs, reclosers etc. However, batteries are relatively expensive and have a limited practical life.

There is therefore a need in the art for a power system that continues to power electrical devices even when the line current is eliminated.

SUMMARY OF THE INVENTION

In accordance with the present invention, a power scavenging device is provided for attachment to an overhead power cable and a support pole. The power scavenging device includes a non-conducting outer body. A first capacitor and a second capacitor are connected in series at a junction. An input lead is secured to the overhead power cable. The input lead is electrically connected to the first capacitor. An output lead is electrically connected to the junction and a ground lead is connected to the second capacitor. A voltage source converter is electrically connected to the output lead, and the first and second capacitors form a voltage divider. The voltage source converter outputs a regulated power.

According to another aspect of the present invention, a power scavenging device is provided for attachment to an overhead power cable and a support pole. The power scavenging device includes a non-conducting outer body. A first resistor and a second resistor are connected in series at a junction. An input lead is secured to the overhead power cable. The input lead is electrically connected to the first resistor. An output lead is electrically connected to the junction and a ground lead is connected to the second resistor. A voltage source converter is electrically connected to the output lead, and the first and second resistors form a voltage divider. The voltage source converter outputs a regulated power supply.

According to yet another aspect of the present invention a power scavenging device is provided for attachment to a first and a second adjacent overhead power cable. The power scavenging device includes a non-conducting outer body, a first capacitor and a second capacitor connected in series at a first junction, a third capacitor connected to the second capacitor in series at a second junction. A first input lead is secured to the first overhead power cable, and also electrically connected to the first capacitor. A second input lead is secured to the second overhead power cable and also electrically connected to the third capacitor. A first output lead is electrically connected to the first junction and a second output lead is electrically connected to the second junction. A voltage source converter is electrically connected to the first and second output leads, wherein the first and second capacitor form a voltage divider and the voltage source converter outputs a regulated power supply.

DETAILED DESCRIPTION OF THE INVENTION

Figure 1:
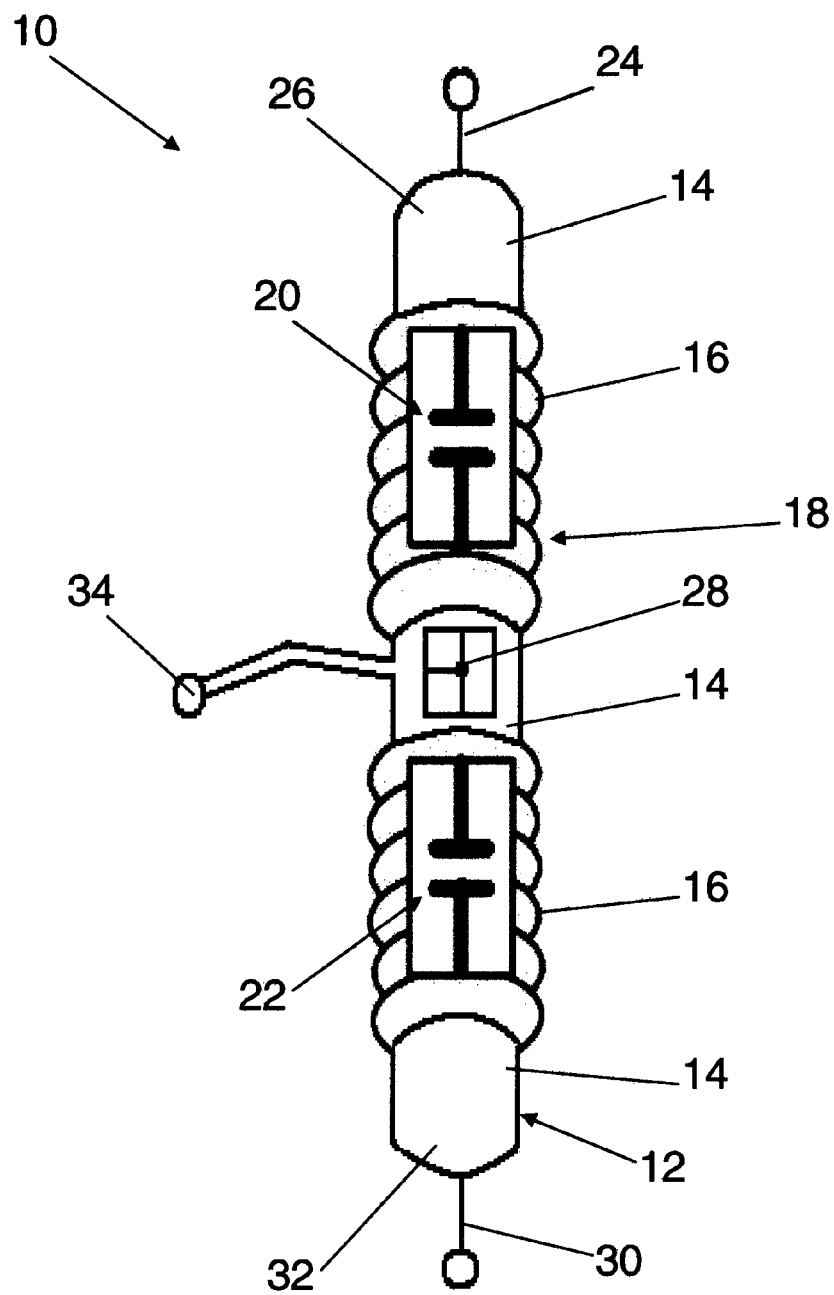
FIG. 1 is a partially schematic front view of a first embodiment of a power scavenging device.

In a first embodiment of the present invention, reference is made to FIG. 1, where a device 10 is shown partially schematically. Device 10 includes a body 12 having a central cylindrical portion 14 a pair of ribbed portions 16. Body 12 is adapted to function as a non-conducting, insulating bushing. Thus, body 12 is composed of a material that is substantially non-conductive. A voltage divider 18 is positioned inside body 12. In this or other embodiments, voltage divider 18 is completely encapsulated within body 12. Voltage divider 18 includes a first capacitor 20 connected in series with a second capacitor 22. An input lead 24 is connected to the first capacitor 20 and extends outwardly from a top end 26 of body 12. First capacitor 20 is connected to second capacitor 22 at a junction 28. A ground lead 30 is connected to the second capacitor 22 and extends outwardly from a bottom end 32 of body 12. An output lead 34 is connected to junction 28 and extends outwardly from a middle portion of body 12.

Figure 2:
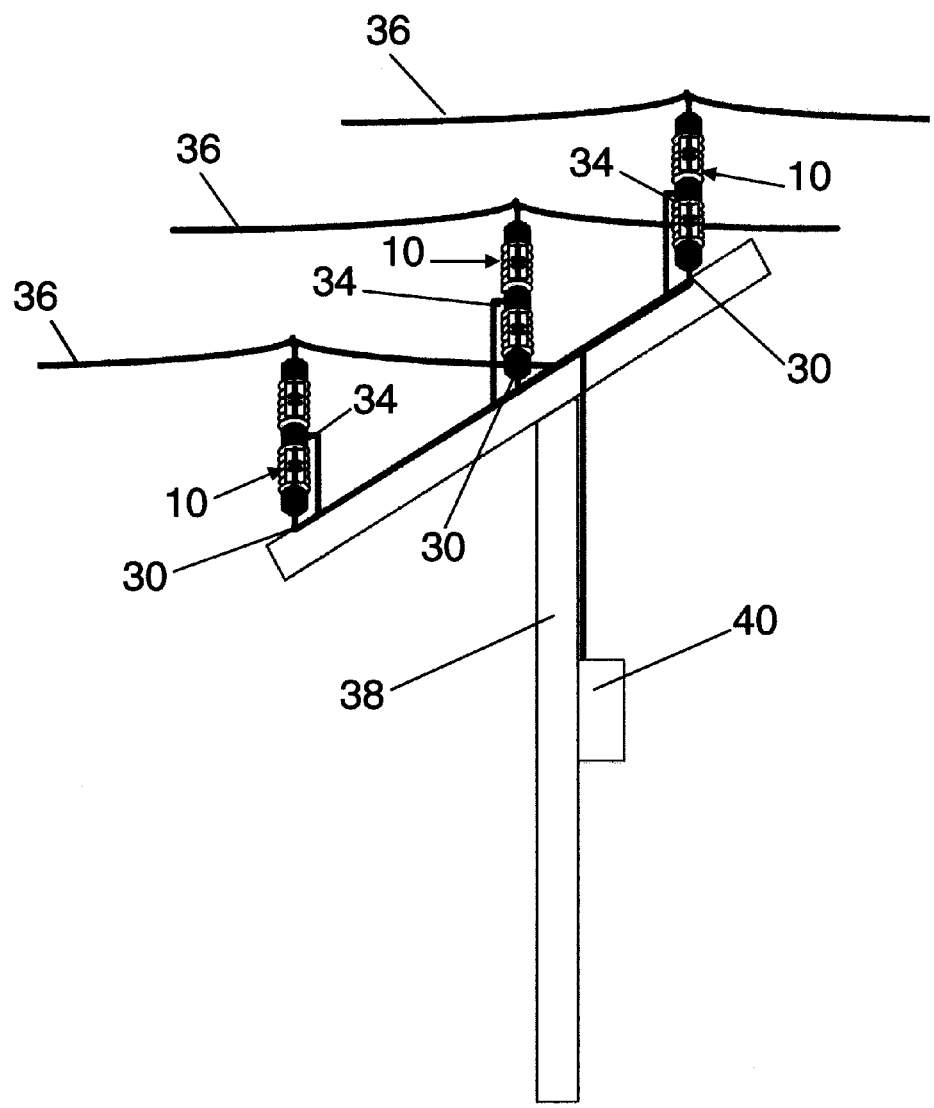
FIG. 2 is a perspective view of the power scavenging device of FIG. 1, mounted to a support pole and connected to a voltage source converter.

The input lead 24 is electrically connected to a voltage source. With reference to FIG. 2, according to one embodiment, the voltage source may be an overhead electrical cable 36, wherein the device 10 is mechanically secured to the electrical cable 36 in any known fashion. According to one or more embodiments, device 10 serves as an insulating bushing that mechanically couples a cable 36 to a support pole 38. Device 10 may be used in conjunction with a single phase or three phase operation. FIG. 2 shows three phase operation wherein each electrical cable 36 is secured to the support pole 38 via a device 10. The output lead 34 and the ground lead 30 of each device 10 are routed to a voltage source converter 40 that is also secured to the support pole 38. Voltage source converter 40 converts the input voltage(s) from device(s) 10 to regulated AC or DC voltage.

The first and second capacitors 20 and 22 may have any number of capacitive values depending upon the expected voltage in the electrical cable 36 and the desired output voltage from device 10. According to one embodiment first capacitor 20 and second capacitor 22 are selected so that the output voltage at output lead 34 is within the range of 100V to 500V. Ceramic capacitors are particularly suitable for use in the present invention, though it should be appreciated that other capacitor types may be employed. It should also be appreciated that first and second capacitors may be substituted with resistive 90, 92 or inductive elements.

For many applications, voltage source converter 40 may comprise a rectifier bridge wherein the output is regulated to a desired level. However, it should be appreciated that other voltage source converters may be employed. The output from voltage source converter 40 may then be used to power electrical distribution devices such as, for example, IEDs, fault indicators, wireless transmitters, communication devices, etc.

In this manner, electrical power is made available to electrical distribution devices even if a downstream fault occurs. In such a situation, though little or no current may pass through electrical cable 36, a voltage potential remains, which is used in the manner described above.

Figure 3:
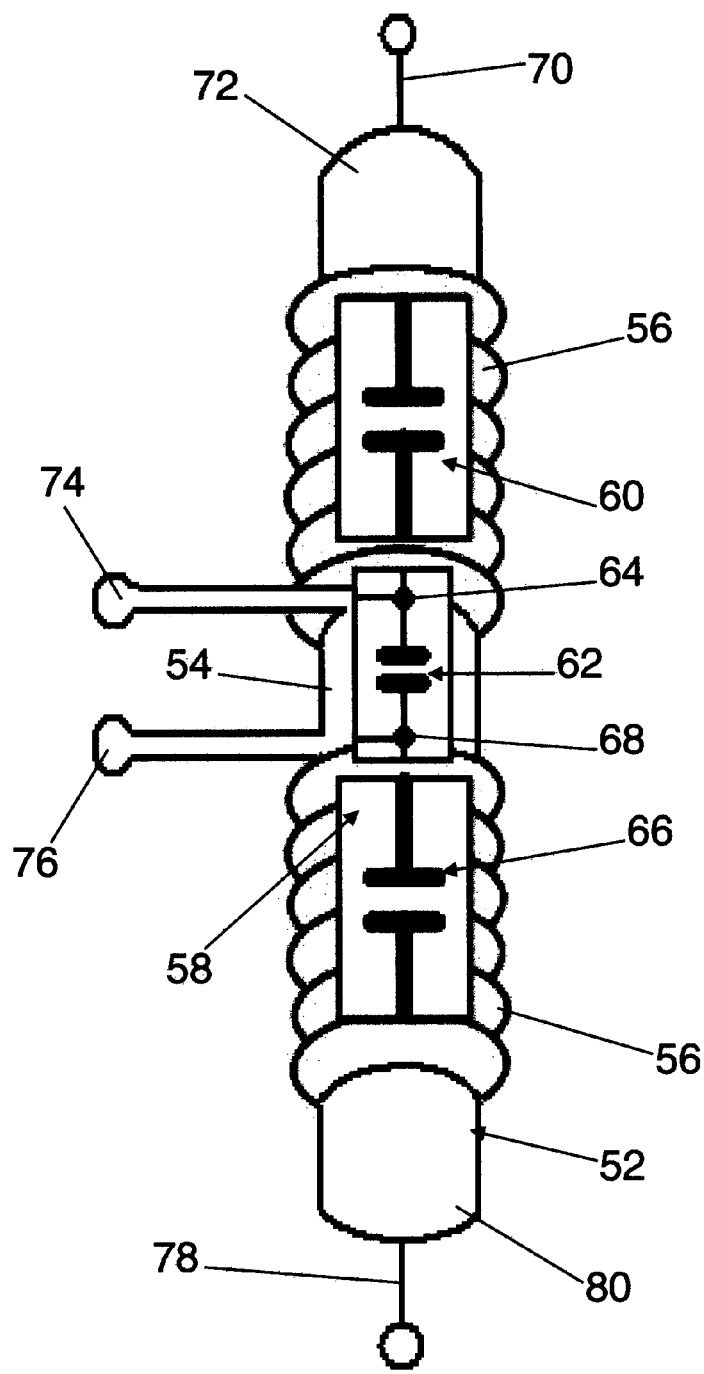
FIG. 3 is a partially schematic front view of a second embodiment of a power scavenging device.
Figure 4:
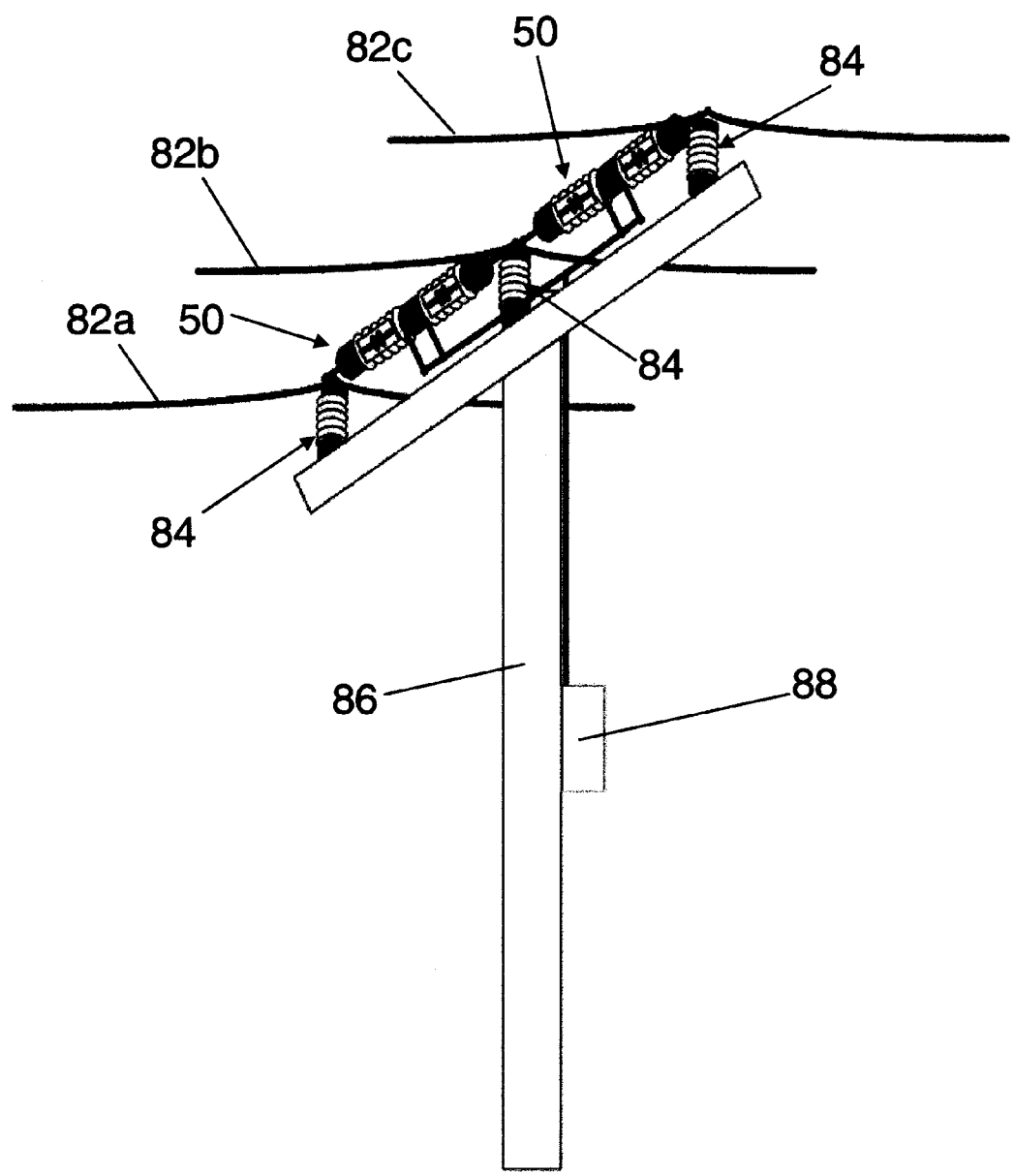
FIG. 4 is a perspective view of the power scavenging device of FIG. 3, mounted to a support pole and connected to a voltage source converter.

With reference now to FIGS. 3 and 4, an alternate embodiment of the present invention is disclosed. A device 50 includes a body 52 having a central cylindrical portion 54 a pair of ribbed portions 56. Body 52 is adapted to function as a non-conducting, insulating bushing. Thus, body 52 is composed of a material that is substantially non-conductive. A voltage divider 58 is positioned inside body 52. In this or other embodiments, voltage divider 58 is completely encapsulated within body 52. Voltage divider 58 includes a first capacitor 60 connected in series with a second capacitor 62 at a first junction 64. Second capacitor 62 is connected in series to a third capacitor 66 at a second junction 68. A first input lead 70 is connected to the first capacitor 60 and extends outwardly from a top end 72 of body 52. A first output lead 74 is connected to first junction 64 and extends outwardly from a middle portion of body 52. A second output lead 76 is connected to second junction 68 and extends outwardly from a middle portion of body 52. Finally, a second input lead 78 is connected to the third capacitor and extends outwardly from a bottom end 80 of body 52.

The first input lead 70 is electrically connected to a first voltage source and the second input lead is electrically connected to a second voltage source. With particular reference to FIG. 4, according to one embodiment, the first and second voltage source may be overhead electrical cables 82 operating at alternate phases. According to one or more embodiments, standard insulating bushings 84 may mechanically couple cables 82 to a support pole 86. Device 50 may be electrically coupled to adjacent electrical cables 82. In one embodiment, one device 50 is coupled between two electrical cables 82. According to another embodiment, as shown in FIG. 4, in a three phase configuration, a first device 50 is electrically coupled to a first and second electrical cable 82a and 82b and a second device 50 is electrically coupled to the second electrical cable 82b and a third electrical cable 82c. The first and second output leads 74 and 76 of each device 50 is routed to a voltage source converter 88 that is also secured to the support pole 86. Voltage source converter 88 converts the input voltage(s) from device(s) 50 to regulated AC or DC voltage.

Figure 5:
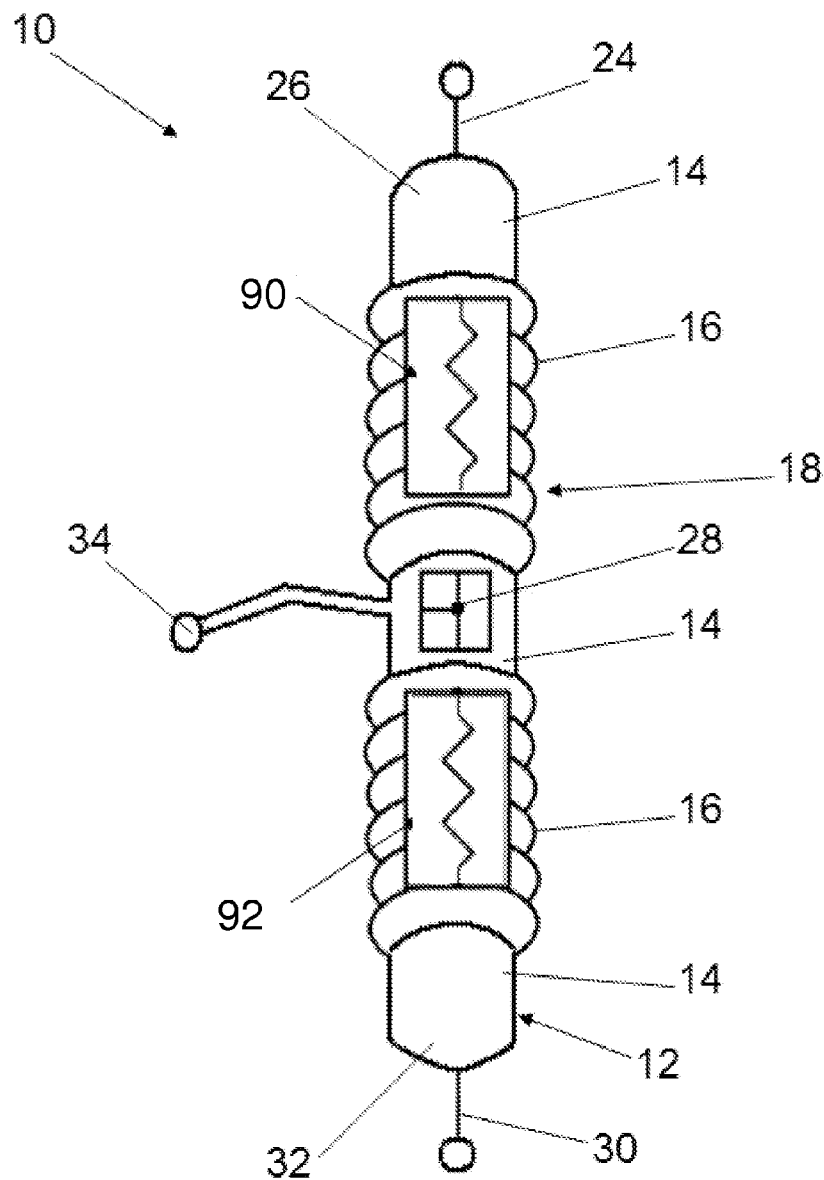
FIG. 5 is a partially schematic front view of a third embodiment of a power scavenging device.

With reference now to FIG. 5, the power scavenging device has a non-conducting outer body and first and second resistors connected in series at a junction. An input lead is secured to the overhead power cable. The input lead is electrically connected to the first resistor. An output lead is electrically connected to the junction and a ground lead is connected to the second resistor. A voltage source converter is electrically connected to the output lead, and the first and second resistors form a voltage divider. The voltage source converter outputs a regulated power supply.

The first, second and third capacitors 60, 62, and 66 may have any number of capacitive values depending upon the expected voltage in the electrical cables 82 and the desired output voltage from device 50. According to one embodiment capacitors 60, 62, and 66 are selected so that the output voltage at output leads 74 and 76 is within the range of 100V to 500V. Ceramic capacitors are particularly suitable for use in the present invention, though it should be appreciated that other capacitor types may be employed. It should also be appreciated that first, second and third capacitors may be substituted with resistive 90, 92 or inductive elements.

For many applications, voltage source converter 88 may comprise a rectifier bridge wherein the output is regulated to a desired level. However, it should be appreciated that other voltage source converters may be employed. As above, the output from voltage source converter 880 may be used to power electrical distribution devices such as, for example, IEDs, fault indicators, wireless transmitters, communication devices, etc.

In this manner, electrical power is made available to any number of electrical distribution devices even if a downstream fault occurs. In such a situation, though little or no current may pass through electrical cable 82, a voltage potential remains, which is used in the manner described above.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A power scavenging device for attachment to an overhead power cable and a support pole, the power scavenging device comprising a bushing having a non-conducting outer body, a first capacitor and a second capacitor connected in series at a junction, an input lead secured to the overhead power cable, said input lead electrically connected to said first capacitor, an output lead electrically connected to said junction, a ground lead connected to said second capacitor, and a voltage source converter electrically connected to said output lead, wherein said first and said second capacitor form a voltage divider and said voltage source converter outputs a regulated power supply.

2. The power scavenging device according to claim 1 wherein said voltage source converter includes a bridge rectifier.

3. The power scavenging device according to claim 1 wherein said body further includes at least one ribbed portion.

4. The power scavenging device according to claim 1 wherein said first and said second capacitors are completely encapsulated in said body.

5. A power scavenging device for attachment to an overhead power cable and a support pole, the power scavenging device comprising a bushing having a non-conducting outer body, a first resistor and a second resistor connected in series at a junction, an input lead secured to the overhead power cable, said input lead electrically connected to said first resistor, an output lead electrically connected to said junction, a ground lead connected to said second resistor, and a voltage source converter electrically connected to said output lead, wherein said first and said second resistor form a voltage divider and said voltage source converter outputs a regulated power supply.

6. The power scavenging device according to claim 5 wherein said voltage source converter includes a bridge rectifier.

7. The power scavenging device according to claim 5 wherein said body further includes at least one ribbed portion.

8. The power scavenging device according to claim 5 wherein said first and said second resistor is completely encapsulated in said body.

9. A method of scavenging power from an overhead power cable comprising: providing a device having a non-conductive body and voltage divider encapsulated in said body, an input lead extending outwardly from said body and electrically connected to said voltage divider, and an output lead extending outwardly from said body and electrically connected to said voltage divider; attaching said input lead to the overhead power cable; electrically attaching the output lead with a voltage source converter; securing said device to a support pole, wherein said device serves as an insulating bushing to maintains the overhead power cable away from the support pole; and outputting regulated power from the voltage source converter.

10. A power scavenging device for attachment to a first and a second adjacent overhead power cables, the power scavenging device comprising a bushing having a non-conducting outer body, a first capacitor and a second capacitor connected in series at a first junction, a third capacitor and said second capacitor connected in series at a second junction, a first input lead secured to the first overhead power cable, said first input lead electrically connected to said first capacitor, a second input lead secured to the second overhead power cable, said second input lead electrically connected to said third capacitor, a first output lead electrically connected to said first junction, a second output lead electrically connected to said second junction, and a voltage source converter electrically connected to said first and said second output leads, wherein said first and said second capacitor form a voltage divider and said voltage source converter outputs a regulated power supply.

11. The power scavenging device according to claim 10 wherein said voltage source converter includes a bridge rectifier.

12. The power scavenging device according to claim 10 wherein said body further includes at least one ribbed portion.

13. The power scavenging device according to claim 10 wherein said first, said second and said third capacitor are completely encapsulated in said body.

* * * * *